(12) United States Patent
Shintome

(10) Patent No.: US 6,964,808 B2
(45) Date of Patent: Nov. 15, 2005

(54) WALL SURFACE PANEL CAPABLE OF GENERATING MINUS IONS UTILIZING NATURAL VOLCANIC ASH SOIL

(75) Inventor: Masahiro Shintome, Kanagawa-ken (JP)

(73) Assignee: Takachiho Corporation, Kanagawa (JP)

( * ) Notice: Subject to any disclaimer, the term of this patent is extended or adjusted under 35 U.S.C. 154(b) by 65 days.

(21) Appl. No.: 10/333,750

(22) PCT Filed: Jun. 26, 2001

(86) PCT No.: PCT/JP01/05462
§ 371 (c)(1),
(2), (4) Date: Jan. 29, 2003

(87) PCT Pub. No.: WO03/001008
PCT Pub. Date: Jan. 3, 2003

(65) Prior Publication Data
US 2003/0124396 A1 Jul. 3, 2003

(51) Int. Cl.$^7$ .................. B32B 27/04; B32B 13/02; C04B 20/10
(52) U.S. Cl. .................. 428/294.7; 428/702; 428/703; 95/10; 95/273; 96/52; 96/74; 106/811; 106/812
(58) Field of Search .................. 95/10, 273; 96/52, 96/74; 106/811, 812; 428/294.7, 702, 701, 704, 703

(56) References Cited

U.S. PATENT DOCUMENTS

| | | | | |
|---|---|---|---|---|
| 4,031,684 A | * | 6/1977 | Shibata ................ | 52/612 |
| 5,820,975 A | * | 10/1998 | Oda et al. ................ | 428/219 |
| 6,110,528 A | * | 8/2000 | Kimura et al. ................ | 427/218 |
| 6,171,655 B1 | * | 1/2001 | Shintome ................ | 427/397.7 |
| 6,406,535 B1 | | 6/2002 | Shintome | |

FOREIGN PATENT DOCUMENTS

| | | | | |
|---|---|---|---|---|
| JP | 58-78935 | | 5/1983 | |
| JP | 01-249678 | * | 10/1989 | ......... C04B/38/08 |
| JP | 08-132084 | * | 5/1996 | ......... C02F/3/10 |
| JP | 11-062053 | * | 3/1999 | |
| JP | 2000-102598 | * | 4/2000 | ......... A61L/9/00 |
| JP | 2000356019 | | 12/2000 | |
| JP | 2001-349398 | * | 4/2001 | ......... B01D/53/26 |
| JP | 2001354875 | | 12/2001 | |
| JP | 2001-096126 | * | 4/2004 | |

OTHER PUBLICATIONS

English Language Abstract of JP 2001–354875.
English Language Abstract of JP 2000–356019.
English Language Abstract of JP 58–78935.

* cited by examiner

*Primary Examiner*—Deborah Jones
*Assistant Examiner*—G. Blackwell-Rudasill
(74) *Attorney, Agent, or Firm*—Greenblum & Bernstein, P.L.C.

(57) ABSTRACT

A wall is formed by adding a predetermined amount of binding agent and water to volcanic ash sediment, which is comprised of mineral silicate including at least silicic acid and aluminum oxide, kneading them, and applying to an arbitrary plane. Through a natural reaction of positive ions included within mineral silicate and moisture included within the atmospheric air, thereby exchanging ions, minus ions are generated on an application plane. The amount of minus ions generated is, in a unit volume, between three and six times as many as that of the minus ions generally included in the atmospheric air. The combination of this application plane and humidity control apparatus is used as a minus ion generation system through adjustment of amount of moisture included within the atmospheric air so as to control the ion exchanging rate. In the case where said volcanic ash sediment includes titanium oxide, it reacts with hydrogen or oxygen generating active oxygen species or oxygen free radical. Using this function of generating the active oxygen species, the application plane is utilized as an air filter.

13 Claims, 2 Drawing Sheets

FIG.2

WALL SURFACE PANEL CAPABLE OF GENERATING MINUS IONS UTILIZING NATURAL VOLCANIC ASH SOIL

BACKGROUND OF THE INVENTION

1. Field of the Invention

The present invention relates to a system and method for effectively generating minus ions by utilizing negative ion exchange functionality included in material for walls, based on the discovery that wall surfaces made of natural volcanic ejecta (volcanic ash sediment) as a main component have high minus ion generation functionality.

2. Related Background Art

In recent years, study in the utilization of "shirasu", a volcanic ejecta and found in abundant deposits, has been carried out in the field of construction. Shirasu is a generic name given to white lumps of volcanic ejecta and the secondary sedimentation originating therefrom, which are widely distributed about the Southern Kyushu area of Japan. Conventionally, almost all examples of using shirasu have been as building material that has undergone secondary processing; however, the inventor implements non-processed shirasu as a finishing coat material to be used in construction (U.S. Pat. No. 6,171,655 and Japanese Patent Application No. 2000-391856), and is experiencing commercial success.

Crystallization differentiation occurs due to the cooling of high-temperature magma, thereby clustering and crystallizing the main components of magma, for example, $SiO_2$, $Al_2O_3$, $Fe_2O_3$, FeO, MgO, CaO, $Na_2O$, $K_2O$ together into minerals. Soon thereafter these are violently ejected, forming this shirasu. Shirasu comprises approximately 30% crystallized minerals and approximately 70% non-crystalline volcanic glass.

Non-crystalline volcanic glass takes on a porous pumice-like constitution due to the vigorous emission of the volatile components of magma, and comprises 65 to 73% $SiO_2$, 12 to 16% $Al_2O_3$, 2 to 4% CaO, 3 to 4% $Na_2O$, 2 to 4% $K_2O$, and 1 to 3% iron. The crystallized minerals comprise mostly plagioclase, but also include some hypersthene, quartz, augite, magnetite and the like.

Examples given for shirasu processing include the utilization of "shirasu balloons", which are obtained through rapid heating. When shirasu is heated, softening of glass contained in the shirasu and evaporation of water contained in the shirasu occur at the same time to cause foaming, and forming the hollow spherical bodies of what is referred to as "shirasu balloons" (developed in 1970 by Kyushu Kogyo Gijutsu Shiken Kenkyusho). Shirasu balloons are naturally produced through high-temperature heating by magma, and are included within shirasu. The approximate size of shirasu balloons naturally included in shirasu range from 30 to 600 $\mu$m, and characteristics include being non flammable, a low bulk density, a high melting point, low thermal conductivity, low dielectric constant, non-toxic, and do not emit toxic gas. In recent years, shirasu balloons having sizes ranging from 600 to 3000 $\mu$m have been artificially produced. Lightweight industrial coatings capable of thick application have been produced by secondary processing of such shirasu balloons. In addition, usage in construction materials such as for ceiling materials that are light and do not require much strength has also come to enjoy full-scale use; moreover, progress in the development of polymer composite materials using pulverized shirasu is continuing.

In comparison with technology where shirasu undergoes secondary processing, direct commercialization of non-processed shirasu has not existed for very long. This is due to the fact that shirasu has extremely high flow properties in water. Evidence of the high flow properties in water can be seen in, for example, conditions where ground level shirasu is eaten away and countless eroded valleys have appeared.

If amalgamated substance of shirasu and water is applied as it is as material for a wall, cracks will appear in the surface when it dries. Furthermore, in addition to cracks in the surface due to drying, a water flow phenomenon also occurs, where water in the surface of the wall descends and flows down on the surface of the wall.

The inventors have overcome problems such as cracks and water flow by adding a predetermined percentage of a predetermined material that includes a clay component having high water-retentiveness and have achieved commercialization of a wall material that effectively uses the natural volcanic ash material shirasu, as disclosed in the above-mentioned U.S. patent. Not only is this wall material currently enjoying commercial success, but is also gaining favorable evaluation from, for example, the Kyushu Kogyo Gijutsu Shikenjo, the Kagoshima Prefectural Institute of Industrial Technology (in particular, the Materials Division), and the Miyazaki Prefecture Industrial Technology Center. The development and commercialization of shirasu wall materials has had an extremely high effect on market activity such that the price of shirasu volcanic ash, which used to be traded in the neighborhood of JPY3000 per 10 tons, has become approximately JPY10,000 per 10 kg.

SUMMARY OF THE INVENTION

In recent years, the inventors have found a novel effects of wall materials containing natural shirasu as a main component. The first effect thereof is a minus ion generating effect based on weak ion exchange functionality with shirasu, which is a natural volcanic ejecta. The second effect is a sterilizing and deodorizing effect by active oxygen species (i.e., oxygen free radicals) generated through reaction with moisture and/or oxygen included in the air, which has also been confirmed. These effects may be efficiently brought out when the natural shirasu wall material is applied onto a plane such as a wall and a panel securing a sufficient surface area.

More specifically, the minus ion generating effect has been measured and confirmed by the inventors as generating a level of minus ions that is one digit higher than that of minus ions existing in the air at room temperature at normal humidity. Such minus ion generating effect is not lost even at high humidity or during the rainy season, for example. Rather, when a water mist is sprayed onto a wall surface, the minus ion effect is strongly brought out; this effect should be distinguished from the Lennard effect (waterfall effect), as is described later.

The Lennard effect is the effect where the surface area of water changes, or for example, water drops splashing at the base a waterfall split, positively charging the split water drops themselves and negatively charging the ambient air. In contrast, since the generation of minus ions from the wall surface applied with a wall material having natural shirasu as a main component is a continuous generation of minus ions based on a weak ion exchange functionality with the inside of wall materials, it is different from an instantaneous generation of minus ions due to splitting of water drops such as generation by the Lennard effect.

The weak ion exchange functionality of shirasu is considered to emanate from the existence of mineral silicate configuring the shirasu. The mineral silicate having shirasu as a main component has a structure where positive ions such as Al, Mg, Ca, H, or the like are bonded as counter ions to the tetrahedral structure of the bond formed between silicic acid, which is the base unit, and oxygen. In the case of shirasu, since it is already calcinated by magma, there is less probability that the metallic ions that have been encapsulated in the mineral silicate lattice site travel (i.e., exchange); however, the hydrogen ions that have been encapsulated in the lattice are able to travel. The mineral silicate configuring shirasu has a porous pumice-like constitution, and has naturally water-absorbing properties. In addition, aluminum oxide included within mineral silicate has high water-retentiveness, and hydrogen ions are trapped within the mineral silicate lattice. Such mineral silicate has a property as an ion exchange body to take in hydrogen ions bonded to water molecules included in the air, and in exchange, emit encapsulated hydrogen ions, $H_3O^+$.

Furthermore, aluminum oxide ($Al_2O_3$), which bonds to silicic acid to configure mineral silicate, has a porous constitution with high moisture-retentiveness, water-retentiveness, and gas absorptive power. Accordingly, it is possible to take moisture (water molecules) included in the air into the mineral silicate lattice and retain it for a ling time, continuously exchanging ions. In particular, the fact that there is an abrupt increase in the minus ions count when measurement is made following a certain interval after application of a water mist insinuates that mutual reaction of hydrogen ions in the air with shirasu material is facilitated to enhance the negative charge of the air on the interface, and thereby increase the amount of minus ions.

The present invention utilizes the minus ion generating effect of wall material having natural shirasu as a main component. The first aspect of the present invention provides a wall panel comprising a base layer, and an application layer, which results from applying (plastering) onto said base layer a wall material having volcanic ejecta as a main component, which is comprised of mineral silicate including silicic acid and aluminum oxide; wherein within said application layer, ion exchange between moisture in air and the mineral silicate is performed generating three to six times as many minus ions as the minus ions included in the air under natural conditions.

As described above, due to the weak ion exchange functionality with the mineral silicate included within volcanic ejecta (shirasu) and high water-retentiveness by the porous constitution thereof, $H_3O+$ is constantly emitted to the interface between the wall panel and the air, negatively charging that air and thereby generating the same amount of minus ions.

The application material having volcanic ejecta (shirasu) as a main component is made by mixing 4 to 5 parts by weight of a binding agent relative to 10 parts by weight of non processed shirasu, adding an appropriate amount of water thereto, and kneading them. As a result, cracks and the like do not occur, and in addition to functioning as an application material for walls, the ion exchange functionality and water-holding capacity of shirasu can be maintained. In addition, it is possible to secure a wide area and efficiently generate minus ions at the surface through internal ion exchange functionality by applying so as to make a flat surface.

A second aspect of the present invention provides a minus ion generation system comprising a wall surface to which a wall material with volcanic ejecta as the main component, which is comprised of mineral silicate including silicic acid and aluminum oxide, is applied; and a humidity control apparatus, which adjusts an amount of moisture included in the atmospheric air; wherein a desired amount of minus ions are generated from said wall surface by adjusting humidity using said humidity control apparatus and thereby controlling the ion exchange rate due to mineral silicate.

By combining such a wall comprising shirasu material with the humidity control apparatus, it is possible to artificially increase and control the level of minus ion production at the wall surface. This system is based on the discovery that the amount of minus ions produced from the wall applied with a wall material having shirasu as the main component during the rainy season or when there is high humidity, is even higher than normal. Such humidity control apparatus may be an air conditioner including a humidifier or humidity control functionality.

The minus ion effect is known to ease feelings of exhaustion and tension, improve concentration, and suppress oxidization within the body; accordingly, the minus ion production system utilizing a wall applied with wall material having shirasu as a main component can be widely in used rooms such as relaxation rooms, medical examination rooms, nursing care rooms. In addition, the minus ion producing system of the present invention is particularly superior at bringing about such effects when applied in densely populated living spaces such as apartments and condominiums. It is possible to maintain high minus ion concentration in a room and create a comfortable living space.

Moreover, in the case where wall material having shirasu as a main component is used in exterior wall applications, the number of minus ions in the air of the surrounding residential area is increased and provides an improved environment for the entire region.

The secondary effect that shirasu has of producing active oxygen species (or oxygen free radicals) depends much on the titanium oxide included within the mineral silicate that configures shirasu. The chemical species existing as active oxygen species and also as free radicals is referred to as oxygen free radicals. It is well known that such active oxygen species has strong oxidation power and corresponding germicidal power, and an organic material decomposing power, and through catalytic reaction with targeted organic material or chemical species, promotes germicidal properties, decomposition, and a deodorizing effect.

Titanium oxide is also well known that it performs a photocatalytic reaction with natural light, illuminated lights, etc. indicating an outstanding effect of preventing from becoming dirty. By using a wall material, which has shirasu included within natural titanium oxide as a main component, for interior decorations in rooms, the effects of naturally preventing from becoming dirty, cleaning the atmospheric air in rooms, and deodorizing without use of chemical agents may be brought out.

By applying a wall material having shirasu as a main component, which naturally includes such component, to make a flat surface, it may be used as a natural air filter.

BRIEF DESCRIPTION OF DRAWINGS

The above-mentioned and other features and results of this invention will become more apparent by referencing the following detailed description of the invention taken in conjunction with the accompanying drawings, wherein.

DETAILED DESCRIPTION OF PREFERRED EMBODIMENTS

Figure 1:
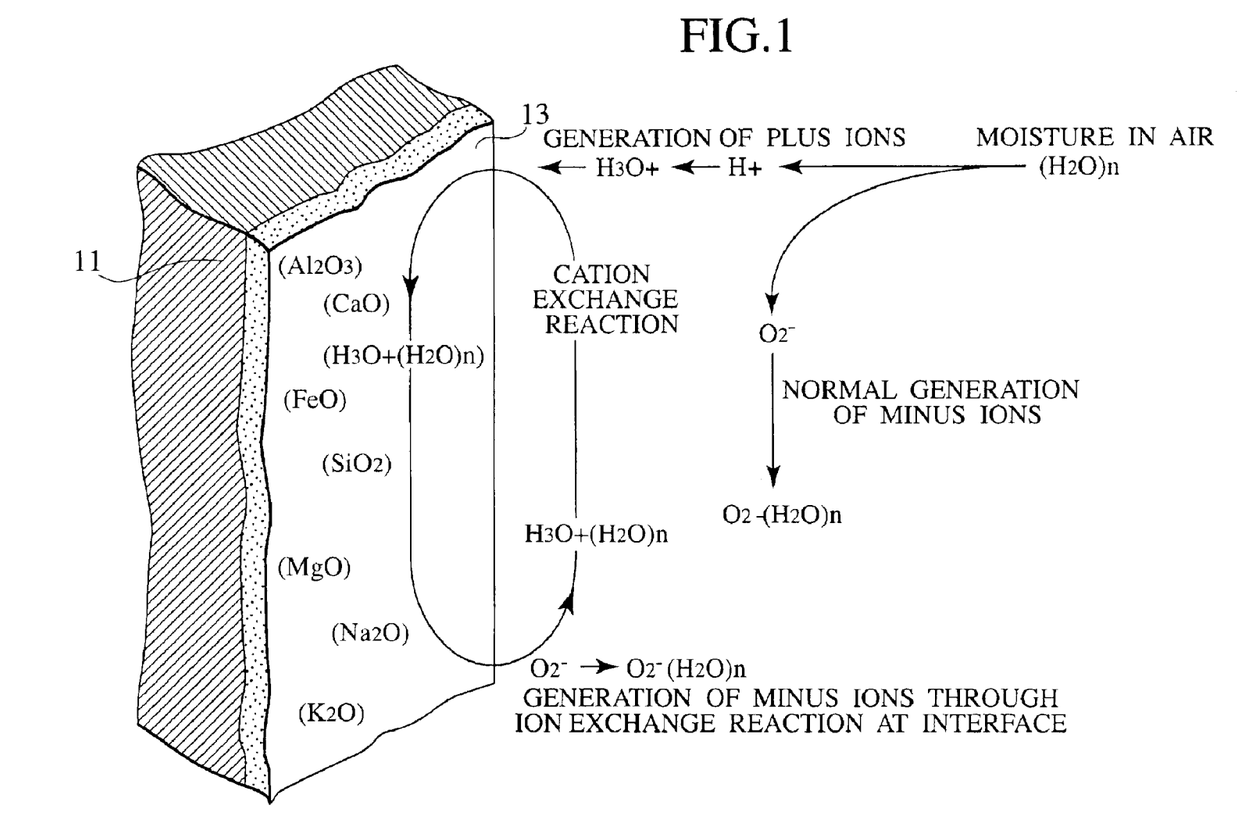
FIG. 1 is a diagram describing ion exchange functionality of a wall surface applied a wall material having shirasu as a main component, according to the present invention.

FIG. 1 is a diagram describing a mechanism producing minus ions at the wall/air interface through the interactive reaction of the wall surface that has been applied a wall material having the natural volcanic ash material shirasu as a main component and moisture in the air.

Wall material 13, which is widely spread upon base layer 11, comprises 50 to 65% dried natural volcanic ash material shirasu, 30 to 40% binding agent, 3 to 10% clay component, 5 to 10% shirasu balloons and 1 to 5% fibers for plastering. These materials are kneaded together with an appropriate amount of water securing a sufficient surface area through application to base layer 11.

Dried shirasu is obtained by screening, such as with a wire sieve, natural shirasu that has been collected to give particles having a diameter of approximately 5 mm or smaller, removing impurities, and drying. Gypsum plaster, for example, may be used as the binding agent (binder). The clay component is to give plasticity during the application process, and in a preferred embodiment, clay including hydrous mineral silicate in the constitution thereof is employed. Since such viscosity shows plasticity as moisture is taken on, and it hardens as it dries, non processed volcanic ash sediment shirasu is suitable when made into a coating material. More specifically, a clay component including silicon dioxide, aluminum oxide, iron oxide, magnesium oxide, calcium oxide, titanium oxide, or the like as a constituent is used. Such a clay component has particularly superior adhesive properties, plastic properties, and dispersion properties, and has a pH 5.9, plasticity index of 22.1, and viscosity of 74 $\mu$ 97% Pass.

Shirasu balloons are also included within the dried shirasu, which allows the finished surface of the wall material to have a soft feel to it. The fiber for plastering functions as a binder and acts to prevent cracks in surfaces; here, hemp fiber or straw (wara) fiber is employed. If necessary, after application of the wall material, 0.08 to 2% plant-derived paste is applied in order to prevent degradation of the surface due to excessive drying. The plant-derived paste may comprise a mixture of (0.03 to 1%) cotton wool and (0.05 to 1%) "tsunomata" (red algae), which has been boiled with seaweed and formed into a powder.

In addition to this, an adhesion-reinforcing agent with a basic ingredient of natural cellulose (pulp fiber), or an organic pigment may be added.

The amount of binding agent should be 4 to 5 parts by weight relative to 10 parts by weight of the dried shirasu. This allows hardening properties and adhesive properties to be imparted to the dried shirasu. The amount of clay component should be 1 to 1.7 parts by weight relative to 6 parts by weight of the dried shirasu.

Although the dried shirasu has been sifted, it comprises large particles, medium particles, and small particles. Large particles are classified as having a diameter of approximately 1.1 mm to 2.3 mm, medium particles as having a diameter of approximately 0.2 mm to 1.0 mm, and small particles as having a diameter of approximately 0.1 mm or smaller. The dried shirasu included in wall material 13 of FIG. 1 comprises approximately 5% large particles, approximately 28% medium particles, and approximately 57% small particles.

The main component of the shirasu is silicic acid and the ratio with included components is between 65 and 73%. Since silicic acid itself has its own property of taking on negative electric charge it is given with a positive ion metal (such as aluminum, iron, magnesium, titanium, manganese) that takes on a positive charge, and is bonded with positive ion calcium, sodium, potassium, hydrogen, or the like, to configure a mineral silicate having neutral crystallization. Shirasu is a naturally calcinated white-colored sand-like sediment resulting from this crystallization being exposed to the heat of magma in accordance with volcanic activity; wherein mineral silicate, which is a component thereof, has a structure where positive ions such as Al, Mg, Ca, H or the like are bonded as counter ions to the tetrahedral structure of the bond formed between silicic acid, which is the base unit, and oxygen. Of these ions, the positive metallic ions barely travel due to the calcination by magma, however, the hydrogen ions are able to travel. Accordingly, additional hydrogen ions are taken in to the silicate lattice site comprising a polymer structure, and in exchange, hydrogen ions there included are emitted, becoming what is referred to as the object of ion exchange.

In addition, alumina (aluminum oxide or $Al_2O_3$), which is generated in the course of the calcination process by magma, occupies 12 to 16% of the components of shirasu. Due to the large porous structure of the surface of alumina, water adsorbability and gas adsorbability is high. In conformity with such characteristics of alumina, the shirasu has high water-holding capacity in addition to ion exchange functionality.

In FIG. 1, aeroionization is caused by various contributing factors in the air. For example, not only the air itself, but moisture within the air separates into pairs of plus and minus ions due to ionization of the air caused by ultraviolet rays and/or due to the photo-electric effect of sun rays with specific wavelengths. Accordingly, even in conditions where wall material having shirasu as a main component is not being used, when humidity is approximately 50%, there exists 300 to 500 minus ions per cc in the air.

Meanwhile, as shown in FIG. 1, if wall material 13 having shirasu as a main component is being used, $H_3O^+$, a plus ion in the air reacts with the mineral silicate structuring wall material 13 at the interface of wall material 13. More specifically, when positive ions of $H_3O^+$ in the atmospheric air attempt to be captured in the silicate lattice of the shirasu wall surface, the mineral silicate releases hydrogen ions having the same sign or a chemical species corresponding thereto. This hydrogen ($H^+$) reacts with the water molecules to again produce $H_3O^+$, and this newly produced $H_3O^+$ is again captured in the site of the silicate lattice. Through such a chain reaction progressing throughout the interface of the shirasu wall, positive ion exchange continues to be repeated within the wall material having shirasu as a main component, while the successively produced positive ions $H_3O^+$ bond to the water molecules existing within the mineral silicate, form clusters of $H_3O^+ (H_2O)_n$ ions that take on a positive charge, and become a surface potential film on the surface of the wall. This potential allows the amount of minus ions near the wall surface to increase.

Such ion exchange functionality becomes possible through the hydro-retentive properties and gas adsorptive properties of the porous pumice-like mineral silicate; moreover, use as a wall material is thought to increase interface with the air and further facilitate production of minus ions at the interface.

Figure 2:
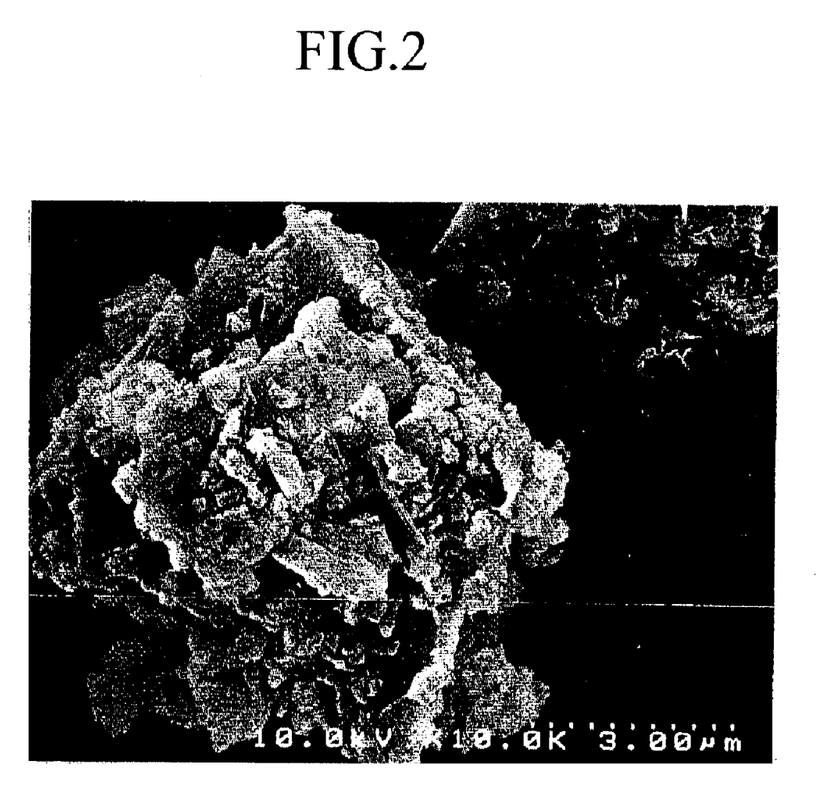
FIG. 2 is a photomicrograph of shirasu molecules.

FIG. 2 is a photomacrograph of shirasu molecules having a diameter of approximately 0.6 mm. As it is clearly shown in this photograph, the structure has such extreme precision and depth that it is almost unthinkable that this is an artificially produced material. Since it is possible to use such shirasu particles without processing, together with sufficiently maintaining ion exchange functionality, such porous properties allow wall material 13 to function as a type of air filter.

In order to demonstrate the minus ion generating effect of wall material 13 where shirasu has been made a main component according to the present invention, various measurements have been carried out.

<Test 1>

In six model houses (A through F) where wall material 13 having shirasu as a main component is used for interior decoration, minus ion measurement is performed for rooms where shirasu wall material 13 is used and for rooms where it is not used, respectively. These model houses are all located within Yokohama. Model houses A, B, and C of the six model houses are measured under the conditions where temperature is 6.5° C. and humidity is 50.5%; model houses A, D, E, and F are measured under the conditions where temperature is 26° C. and humidity is 68%.

The rooms to be measured (both the rooms using shirasu wall material and the rooms that do not) are kept completely closed from the day before. As to measurement positions, measurement is performed for each room at a fixed position 50 cm above the floor surface at the middle of the room. In addition to the middle of each room, an additional measurement is performed in a fixed position approximately 50 cm away from the wall in each of model houses A, D, E, and F. An ion meter IC-1000 made by Universal Ltd. is used as the measuring instrument.

TABLE 1

Measurement under conditions where Temperature = 6.5° C. and Humidity = 50.5%

| MODEL HOUSES | MEASUREMENT PLACES | MAXIMUM/ MINIMUM IN MIDDLE OF ROOM (IONS/cc) | AVERAGE | FINISHING MATERIAL FOR INTERIOR DECORATION |
|---|---|---|---|---|
| A (Two-story wooden house | Six-Jyo Japanese-style room (approximately 12 m$^2$) | 1270/780 | 1025 | Shirasu wall |
| | Eight-Jyo Western-style room (approximately 16 m$^2$) | 340/240 | 290 | Red pine board wall |
| B (Two-story wooden house) | Six-Jyo Japanese-style room (approximately 12 m$^2$) | 1180/790 | 985 | Shirasu wall |
| | Eight-Jyo Western-style room (approximately 16 m$^2$) | 480/280 | 380 | Cedar board pasted wall |
| C (3rd floor in eight-story SRC house) | Six-Jyo Japanese-style room (approximately 12 m$^2$) | 1870/1340 | 1605 | Shirasu wall |
| | Eight-Jyo Western-style room (approximately 16 m$^2$) | 480/280 | 550 | Cedar board pasted wall |

TABLE 2

Measurement under conditions where Temperature = 26° C. and Humidity = 68%

| M. H. | MEASUREMENT PLACES | Center in room | Average | 50 cm from wall | Average | FINISHING MATERIAL |
|---|---|---|---|---|---|---|
| A (Two-story wooden house | Six-Jyo Japanese-style room 12 m$^2$ | 1230/750 | 990 | 2150/1350 | 1750 | Shirasu wall |
| | Eight-Jyo Western-style room 16 m$^2$ | 800/420 | 610 | 860/470 | 665 | Plywood wall |
| D | Six-Jyo Japanese-style room 12 m$^2$ | 1410/990 | 1200 | 1900/1430 | 1665 | Shirasu wall |
| | Twelve-Jyo Western-style room 24 m$^2$ | 880/470 | 675 | 1180/750 | 965 | PB |
| E | Six-Jyo Japanese-style room 12 m$^2$ | 1350/990 | 1170 | 1680/1140 | 1410 | Shirasu wall |
| | Five-Jyo hallway 10 m$^2$ | 950/680 | 815 | 1010/790 | 900 | Vinyl cloth wall |
| F | Six-Jyo Japanese-style room 12 m$^2$ | 3450/2450 | 2950 | 3900/2900 | 3400 | Shirasu wall |
| | Seventeen-Jyo Western-style room 34 m$^2$ | 1010/720 | 865 | 1150/800 | 975 | PB |

As shown in Tables 1 and 2, it is clearly shown that there are differences between rooms using wall material having shirasu as a main component and rooms where it is not used. As shown in Table 1, in the case of relatively low humidity (approximately 50%) within rooms not using wall material having shirasu as a main component, ion measurement counts range between 300 ions per cc and 500 ions per cc, which matches the number of the ions that are found in the normal air of an average house. In contrast, in model houses A to C, rooms using wall material having shirasu as the main component have minus ion levels that are one digit higher, approximately three or more times normal levels.

Moreover, even if the humidity is high (e.g., humidity of 68%), effects of the generated minus ions due to the shirasu wall continue. Other than this, there is a tendency for the number of the generated minus ions to increase as the humidity increases.

As shown in Table 2, the number of minus ions found in the air of each room not using the shirasu wall is somewhat higher, between 600 ions per cc and 850 ions per cc with the higher humidity. On the other hand, there are between 1000 ions and 1200 ions in the middle of the room in those rooms using the shirasu wall, and these numbers are not very different from those in the case where humidity is 50.5%; however, it is found that when measured at the position 50 cm away from the shirasu wall, minus ions are generated at a rate of between 1400 per cc and 1800 per cc. It is considered that this phenomenon emanates from the fact that the rate of ion exchange at the interface between the shirasu wall and the atmospheric air increases as temperature rises; thus additional minus ions are continuously generated at the surface of the wall.

<Test 2>

The generated state of the minus ions inside those rooms using wall material 13 having shirasu as the main component on the wall surface is observed at a low temperature and at a high temperature, respectively, by deliberately changing the humidity in the entire room. Using an ion meter IC-1000 made by Universal Ltd., measurement is performed at a height of 50 cm above the floor in the middle of a 12m² room. The measurement results are shown in Table 3.

TABLE 3

| Humidity | 62% | 72% |
| --- | --- | --- |
| Number of Minus ions (Average) | 1135/cc | 1205/cc |

In general, it is said that the number of the minus ions decreases during rainy days. Since minus ions within living spaces exist generally adhered to clusters of minute water molecules, the number of minus ions increases as the number of clusters increases. However, on rainy days, there is a rejoining of the water molecules which causes the number of clusters to decrease; accordingly, the number of the minus ions decreases.

On the other hand, in rooms that use wall material 12 having shirasu as the main component, even on rainy days, a stable number of generated minus ions is indicated. Other than this, there is a tendency for the count of the generated minus ions to increase as humidity increases. The results shown in Table 3 are measurements obtained in the middle of the room; however, considering the results shown in Table 2, it is estimated that the number of generated minus ions further increases in vicinity of the shirasu wall as the temperature increases.

The mineral silicate configuring the shirasu is a porous pumice-like material having favorable moisture absorption properties and water holding properties, and performs ion exchange at a fixed rate. More specifically, there is cyclical chain reaction of hydrogen ions adhered to water molecules along with moisture included in the air being taken into the silicate lattice site, ion exchange being performed with hydrogen ions included therein, additional positive ions being generated at the interface, and the surrounding air being negatively charged. Even if the number of the clusters included in the air decreases due to rain, the ion exchange chain at the shirasu wall surface is maintained, consequently showing a high rate of minus ion generation.

By utilizing such properties of the mineral silicate configuring the shirasu and combining a wall surface applied with wall material having shirasu as the main component with a humidity control apparatus for controlling humidity, it is possible to construct a minus ion generating system, which provides a desired minus ion environment. In the case where this system is used in an average house, the humidity of a room is adjusted to a certain appropriate value, for example, on dry days, and the inside minus ion generation rate is controlled, making it possible to provide a refreshing space.

In addition, by using this system in a medical examination room or counseling room, it becomes possible to make a patient psychologically stable, promote physical living active potential, and promote cellular regeneration.

<Test 3>

The generated state of minus ions when a water mist is sprayed with an atomizer, etc. onto a wall surface applied with wall material having shirasu as the main component is observed. The area of the room floor is 12 m², and the surface area of the shirasu wall is 29 m². A water mist is applied across the entire surface of the shirasu wall at a rate of 69 ml/m². Measurements are made both before and ten minutes after the water mist is applied.

TABLE 4

|  | Before spray | 10 minutes after spray |
| --- | --- | --- |
| Position 50 cm above floor in middle of room | 1500/1020 1260 ions/cc in average | 2600/1850 2225 ions/cc in average |
| Position 50 cm above and 50 cm apart from wall surface | 1650/1350 1500 ions/cc in average | 3200/1910 2555 ions/cc in average |

It is also found here that due to the existence of the shirasu wall, even before the mist is applied, at least three times the amount of minus ions generally included in the atmospheric air (i.e., between 300 and 500 ions per cc) are generated. An average of 9250 minus ions per cc are recorded at a position 50 cm away from the shirasu wall when a water mist is applied to such a shirasu wall; however, this abrupt increase is temporary, and does not emanate due to the ion exchange functionality of the shirasu wall. Rather, the measurement results obtained when measurement is made following a certain interval after application of the water mist supports the minus ion generation results of the shirasu wall. 10 minutes after the mist is applied, when the number of the minus ions is measured in the middle of the room and at a position 50 cm away from the shirasu wall, whether in the middle of the room or 50 cm away from the wall, a minus ion level that is 1.7 times that before the mist is applied is recorded.

The results of the generated minus ions when a water mist is applied to the surface of the wall having shirasu as the main component should be distinguished from the Lennard effect. In order to show that the increase in minus ions from the shirasu wall does not emanate from the Lennard effect, a comparative example is given, where a water mist is applied at the same rate to a glass window and a plywood wall, respectively, within a room not using wall material having shirasu as the main component; the minus ion levels are then measured three minutes after the water mist is applied and ten minutes after the water mist is applied. The measurement results are shown below.

TABLE 5

|  | Before spray | 3 minutes after spray | 5 minutes after spray |
| --- | --- | --- | --- |
| Glass surface | 730/530 (630 in average) | 500/350 (425 in average) | 620/480 (560 in average) |
| Plywood wall surface | 230/140 (185 in average) | 530/230 (380 in average) | 490/130 (310 in average) |

The increase in the value of minus ions on the surface of the plywood just after the water mist is applied (three minutes later) emanates from the Lennard effect. However, unlike the shirasu wall, the Lennard effect due to mist application does not continue for a long period of time; accordingly, the number of minus ions decreases ten minutes after the water mist is applied. On the other hand, on the surface of the glass, the number of the minus ions decreases just after a water mist is applied (three minutes later), which is can be considered as emanating from the fact that water droplets adhere to the surface of the glass thereby decreasing the number of clusters.

The results shown in Tables 4 and 5 affirm the superior minus ion generating effect of the shirasu wall. As described above, the mineral silicate configuring shirasu is a porous, pumice-like material and has superior water-absorbing properties. In the case where water is applied as a mist with an atomizer or the like, the water and the hydrogen ions adhered thereto are captured and hydrogen ions that had been encapsulated are emitted, allowing the discharged hydrogen ions to bond to the water molecules configuring positive potential on the interface and again try to enter the silicate lattice site. It is considered that the water mist thus applied facilitates such a chain-like ion exchange process, allowing continuous improvement of generation rate of minus ions.

It is well known that minus ions positively influence the health of the human body. According to the results of measuring, for example, fatigue levels using a flicker meter, it is verified that fatigue level is low within a room having a level of minus ions on par with those in an average forest, thereby enhancing concentration power. In addition, according to measurement results recording electrical activity on the surface of the brain using an electroencephalogram, it is indicated that there is higher magnitude of alpha-2 waves (between 10 Hz and 12.75 Hz) within a room having more minus ions than an average room, which may ease feelings of tension and allow relaxation.

In the case where wall material 13 with the shirasu shown in FIG. 1 as the main component is used as the interior decoration of a building and is applied to a wall surface or a ceiling, since sufficient surface area is provided, the ion exchange functionality of the shirasu is brought out increasing the concentration of minus ions within rooms. As a result, the following actions are expected: blood purification action whereby neutralization of blood having a low pH transformed to blood having a higher pH, which promotes healthy resistance; ataractic action whereby intracerebral beta endorphins are activated; modulating action of the autonomic nervous system for insomnia, headache, climacteric disorder, stiff neck, backache, chronic fatigue, etc.; immune system enhancement action whereby intestine and liver functions are improved; lung function enhancement action that improves lung function to facilitate discharge of carbon dioxide and improve oxygen exchange rate; and analgesic action for chronic rheumatism, etc.

Alleviation of the symptoms of insomnia, hay fever, etc. was actually reported by people living in the model houses, and it is also expected that the symptoms of asthma and atopic dermatitis due to house dust, cigarette, etc. can be eased. Wall materials having shirasu as the main component can be used in medical rooms, counseling rooms, relaxation rooms, etc. other than average houses because of the ataractic action and health maintenance effects thereof.

It is suitable for the shirasu wall, which absorbs humidity and generates minus ions, to be used in houses, in particular, in countries having relatively high humidity and rural areas. Moreover, by using the shirasu wall on a ceiling, not only is humidity absorbed to create a comfortable living space, but also generated minus ions in the air are absorbed into a human body, and active oxygen within human body are deoxidized via the mucus membranes and/or capillaries, to help prevent oxidation.

In order to configure a minus ion generation system as mentioned above, water is directly added to mineral silicate including at least silicic acid and aluminum oxide, a predetermined amount of a bonding agent (e.g. gypsum, plaster, etc.), a clay component, shirasu balloons, etc., are kneaded together and applied to wide planes such as the surface of a wall, a panel, etc. Such application may be performed with a trowel or the like; or it may be performed by spraying with a spray gun, etc. Alternatively, it is also allowable for a brush may be used; no specialized application means is required.

After the surface of the wall is dried, humidity within a room with this wall is controlled. Humidity control is performed using a humidistat, an air conditioner, an atomizer, etc. In this manner, the number of minus ions to be generated from the surface of the wall may be regulated to a predetermined amount.

In the case where the wall with the shirasu as the main component is used within a closed room, the effect of generated minus ions is enhanced; however, it may also be used for an exterior wall. In this case, since it is positioned within a open space, it may not provide great increases in the effects of minus ions to those inside room; however, when a wall having shirasu as the main component is used for the exterior wall of a newly-built building within a newly developed residential area, an environment with a higher number of minus ions than that of an ordinary residential area may be provided for the entire town.

An additional effect of wall material 13 having shirasu as the main component is a deodorizing effect and a cleansing effect due to generation of an active oxygen species (oxygen free radicals). Titanium included as titanium oxide within the shirasu reacts with the hydrogen and humidity (moisture) included in the atmospheric air generates an active oxygen species. Such an active oxygen species breaks down organic material existing throughout the atmospheric air and moisture and breaks down odor at their respective source.

In addition, hydrogen included in the shirasu bonds with oxygen generating hydroxyl group (hydroxy radicals (.OH)). In addition, contact with water molecules and oxygen occurring in the course of the exchange process at an electric level that causes a high activation level to occur and generates an active oxygen species (oxygen free radicals) such as super oxide anion radicals ($.O^{2-}$). Since the active oxygen species (oxygen free radicals) have strong germicidal properties and organic material break-down properties, a shirasu wall including this reactive system provides an enhanced sterilizing, deodorizing, and air-freshening effect that freshens air passing through the surface layer and the inside thereof, and therefore functions as a natural air filter to clean the air in a room.

When light is applied to the titanium oxide included in the shirasu and the moisture both inside and outside of the shirasu wall material, what is referred to as a photocatalytic reaction of the titanium oxide occurs. For example, when an ultraviolet light irradiates the titanium oxide, pairs of electron and electron holes are formed, and the pairs react to oxygen and moisture included in the atmospheric air to generate super oxide ions and/or hydrogen radicals with strong oxidative powers. This is well known as the Honda-Fujishima effect.

Wall material 13 having shirasu as the main component shown in FIG. 1 essentially includes a titanium oxide, and the mineral silicate, which is porous and pumice-shaped, (especially, an aluminum oxide) includes water. In other words, wall material 13 itself generates an active oxygen (oxygen free radicals) that functions as an air clean filter. Such a filtering function may be further efficiently brought out when a titanium oxide is used for the clay component, which is to be mixed in to provide plastic properties.

Photocatalytic reaction of the titanium oxide may also include a function bringing out a hyper hydrophilic phenomenon. The ordinary surface of a titanium oxide has stable hydrophobic property due to oxygen cross linking between titanium atoms; however, when an ultraviolet light irradiates the surface of the titanium oxide, part of cross linking oxygen is eliminated and generates oxygen defects. Dissociative absorption of moisture included in the air is made therein to produce chemically absorptive water (hydroxyl group) and thereby becomes hydrophilic. Water molecules are then become attached as physically absorptive water to the hydroxyl group and the hydrophilic properties are stably maintained. Such hyper-hydrophilization brings about prevention of water droplet formation, prevention of tarnishing of the wall surface, and the function of self-cleaning with water.

When the shirasu is used as a wall material and applied to a wide plane, the ion exchange functionality and purifying action of the mineral included in the shirasu are efficiently performed, providing excellent medical and of environmental engineering effects.

What is claimed is:

1. A wall panel generating minus ions, an active oxygen species or oxygen free radicals, comprising:
    a base layer; and
    an application layer, which is applied to said base layer and which is comprised of a wall material comprised of dried shirasu, binding agent, clay component, shirasu balloons, fibers for plastering, and adhesion-reinforcing agent.

2. The wall panel according to claim 1, wherein said base layer and application layer are structured and arranged to produce an amount of minus ions, per unit volume, that is three to six times as many minus ions that exist in ordinary air.

3. The wall panel according to claim 1, wherein said application layer is obtained by mixing and kneading the wall material including 10 parts by weight dried shirasu and 4 to 5 parts by weight binding agent, and an appropriate amount of water.

4. A minus ion generation system, comprising:
    a wall surface to which a wall material comprised of dried shirasu, binding agent, clay component, shirasu balloons, fibers for plastering, and ashesion-reinforcing agent is applied; and
    a humidity control apparatus, which adjusts an amount of moisture in air;
    wherein, a desired amount of minus ions are generated from said wall surface by adjusting humidity using said humidity control apparatus and thereby controlling ion exchange rate on said wall surface.

5. The minus ion generation system according to claim 4, wherein said humidity control apparatus is a humidifier.

6. The minus ion generation system according to claim 4, wherein said humidity control apparatus is an air conditioner with a humidity control function.

7. The minus ion generation system according to claim 4, wherein said system is used in a residential space.

8. A minus ion generation method, comprising
    forming a wall surface by kneading an appropriate amount of water, dried shirasu, binding agent, clay component, fibers for plastering and adhesion-reinforcing agent, and applying to an arbitrary plane; and
    generating minus ions on said wall surface through a natural reaction with moisture in air at room temperature causing ion exchange.

9. The minus ion generation method according to claim 8, further comprising regulating size of each particle of said dried shirasu to be 5 mm or less in diameter, and said dried shirasu is dried by performing calcination thereupon at temperatures between 100° C. and 800° C.

10. The minus ion generation method according to claim 8, further comprising increasing the amount of the minus ions generated by applying a water mist to said wall surface to promote ion exchange.

11. The minus ion generation method according to claim 8, further comprising generating a desired amount of minus ions at said wall surface by adjusting humidity in a building so as to control the amount of said ion exchange; wherein said wall surface is an inner wall surface of a building.

12. The minus ion generation method according to claim 8, wherein said wall surface is an outer wall surface of a building.

13. A method of using a wall surface as an air cleaning filter, comprising:
    forming a wall surface by kneading an appropriate amount of water, dried shirasu, binding agent, clay component, shirasu balloons, fibers for plastering and adhesion-reinforcing agent, and applying to an arbitrary plane; and
    generating an active oxygen species or oxygen free radicals through oxidation-reduction reaction of moisture or oxygen.

* * * * *

UNITED STATES PATENT AND TRADEMARK OFFICE
CERTIFICATE OF CORRECTION

| | | |
|---|---|---|
| PATENT NO. | : 6,964,808 B2 | Page 1 of 1 |
| APPLICATION NO. | : 10/333750 | |
| DATED | : November 15, 2005 | |
| INVENTOR(S) | : M. Shintome | |

It is certified that error appears in the above-identified patent and that said Letters Patent is hereby corrected as shown below:

At column 14, line 9 (claim 4, line 4) of the printed patent, "ashesion" should be --adhesion--.

Signed and Sealed this

Third Day of October, 2006

JON W. DUDAS
*Director of the United States Patent and Trademark Office*